United States Patent
Ookubo et al.

(10) Patent No.: US 10,659,986 B2
(45) Date of Patent: May 19, 2020

(54) RADIO BASE STATION AND MEASUREMENT INFORMATION TRANSMISSION/RECEPTION METHOD

(71) Applicant: NTT DOCOMO, INC., Tokyo (JP)

(72) Inventors: Naoto Ookubo, Tokyo (JP); Takayuki Isogawa, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/090,485

(22) PCT Filed: Mar. 30, 2017

(86) PCT No.: PCT/JP2017/013153
§ 371 (c)(1),
(2) Date: Oct. 1, 2018

(87) PCT Pub. No.: WO2017/175654
PCT Pub. Date: Oct. 12, 2017

(65) Prior Publication Data
US 2019/0116514 A1  Apr. 18, 2019

(30) Foreign Application Priority Data

Apr. 8, 2016  (JP) ................ 2016-078503

(51) Int. Cl.
| | |
|---|---|
| *H04W 24/10* | (2009.01) |
| *H04W 88/08* | (2009.01) |
| *H04L 5/00* | (2006.01) |
| *H04W 4/10* | (2009.01) |
| *H04L 1/16* | (2006.01) |
| *H04W 68/00* | (2009.01) |
| *H04W 72/04* | (2009.01) |

(52) U.S. Cl.
CPC .......... *H04W 24/10* (2013.01); *H04L 1/1664* (2013.01); *H04L 5/001* (2013.01); *H04W 4/10* (2013.01);
(Continued)

(58) Field of Classification Search
CPC . H04W 24/10; H04W 68/005; H04W 88/085; H04W 4/10; H04W 88/08;
(Continued)

(56) References Cited

U.S. PATENT DOCUMENTS

2013/0231125 A1   9/2013  Jeon et al.
2018/0359068 A1*  12/2018 Kim .................. H04W 72/0406

FOREIGN PATENT DOCUMENTS

JP    2013-187909 A    9/2013

OTHER PUBLICATIONS

Huawei et al., "Support for SRS switching among TDD Scells", 3GPP TSG-RAN WG2 Meeting #91bis, R2-154344, Malmo Sweden, Oct. 5-9, 2015 (6 pages).
(Continued)

*Primary Examiner* — Dady Chery
(74) *Attorney, Agent, or Firm* — Osha Liang LLP

(57) ABSTRACT

A radio base station is disclosed including an extension station and a central aggregate station, wherein the extension station includes a processor that determines whether a resource used when a user equipment transmits an uplink reference signal is allocated, a first receiver that receives the uplink reference signal from the user equipment based on a determination result of processor, wherein the processor calculates measurement information based on the uplink reference signal received by the first receiver, and a transmitter that transmits the measurement information calculated by the processor to the central aggregate station, and the central aggregate station includes a receiver that receives the measurement information from the extension station.

14 Claims, 11 Drawing Sheets

(52) U.S. Cl.
CPC ....... *H04W 68/005* (2013.01); *H04W 88/085* (2013.01); *H04L 5/0048* (2013.01); *H04W 72/04* (2013.01); *H04W 88/08* (2013.01)

(58) Field of Classification Search
CPC ...... H04W 72/04; H04L 1/1664; H04L 5/001; H04L 5/0048
See application file for complete search history.

(56) References Cited

OTHER PUBLICATIONS

Pantech, "SRS enhancements for CoMP", 3GPP TSG RAN1 #69, R1-122452, Prague, Czech Republic, May 21-25, 2012 (4 pages).
NTT DOCOMO, Inc., "5G Vision for 2020 and Beyond", 3GPP RAN workshop on 5G, RWS-150051, Pheonix, AZ, USA, Sep. 17-18, 2015 (23 pages).
Nokia, "NOKIA Vision & Priorities for Next Generation Radio Technology", 3GPP RAN workshop on 5G, RWS-150010, Phoenix, AZ, USA, Sep. 17-18, 2015 (17 pages).
International Search Report issued in International Application No. PCT/JP2017/013153, dated May 23, 2017 (5 pages).
Written Opinion issued in International Application No. PCT/JP2017/013153, dated May 23, 2017 (4 pages).
Extended European Search Report issued in the counterpart European Patent Application No. 17779033.4, dated Feb. 21, 2019 (9 pages).

\* cited by examiner

FIG.7

| HEADER FIELD | NUMBER OF IDENTI- FICATION INFORMATION ITEMS 2 | C-RNTI #100 | SIR = 10 dB | TA COMMAND = 31 | Fd = LOW | C-RNTI #200 | SIR = 15 dB | TA COMMAND = 33 | Fd = MIDDLE |

RADIO BASE STATION AND MEASUREMENT INFORMATION TRANSMISSION/RECEPTION METHOD

TECHNICAL FIELD

The present invention relates to a radio base station and a measurement information transmission/reception method.

BACKGROUND

In order to efficiently support an area like a hot spot with high traffic in a Long Term Evolution (LTE) or LTE-advanced (LTE-A) radio communication system, a technique called a centralized radio access network (C-RAN) capable of accommodating a large number of cells while suppressing a device cost is known (see Non-Patent Documents 1 and 2).

The C-RAN includes one or more radio units (RUs) serving as a base station installed in a remote site and a digital unit (DU) serving as a base station that centrally controls the RUs. The DU has the layers 1 to 3 functions included in a base station. An Orthogonal Frequency Division Multiplexing (OFDM) signal generated by the DU is sampled and transmitted to the RU and then transmitted through a radio frequency (RF) function unit included in the RU.

PRIOR ART DOCUMENTS

Non-Patent Documents

Non-Patent Document 1: "5G Vision for 2020 and Beyond", 3GPP RAN Workshop on 5G, RWS-150051, Sep. 17-18, 2015

Non-Patent Document 2: "NOKIA Vision & Priorities for Next Generation Radio Technology", 3GPP RAN Workshop on 5G, RWS-150010, Sep. 17-18, 2015

SUMMARY

According to one aspect, embodiments disclosed herein include a radio base station including an extension station and a central aggregate station, wherein the extension station includes a processor that determines whether a resource used when a user equipment transmits an uplink reference signal is allocated, a first receiver that receives the uplink reference signal from the user equipment based on a determination result of the processor, wherein the processor calculates measurement information based on the uplink reference signal received by the first receiver, and a transmitter that transmits the measurement information calculated by the processor to the central aggregate station, and the central aggregate station includes a receiver that receives the measurement information from the extension station.

BRIEF DESCRIPTION OF DRAWINGS

FIG. 7 is a diagram illustrating a specific example of measurement information transmitted between a DU and an RU (1/2);

DETAILED DESCRIPTION OF THE PREFERRED EMBODIMENTS

Hereinafter, an exemplary embodiment of the present invention will be described with reference to the accompanying drawings. An embodiment to be described below is merely an example, and an embodiment to which the present invention is applied is not limited to the following embodiment. For example, a radio communication system according to the present embodiment is assumed to be a system complying with LTE/LTE-A, but the present invention is not limited to LTE/LTE-A and is also applicable to other systems. In this specification and claims set forth below, "LTE/LTE-A" is used in a broad sense including not only a communication system corresponding to Release 8 or 9 of 3GPP but also a communication system corresponding to Release 10, 11, 12, or 13 of 3GPP or a fifth generation communication system corresponding to any release subsequent to Release 14 of 3GPP unless otherwise specified.

Further, in the following description, one TTI is used to represent a minimum unit of scheduling. Further, one subframe is used on the premise that it has the same length as one TTI, but it is not intended to be limited thereto, and it can be replaced with any other unit as well.

The "layer 1" and the "physical layer" are synonymous. The layer 2 includes a medium access control (MAC) sublayer, a radio link control (RLC) sublayer, and a packet data convergence protocol (PDCP) sublayer. The layer 3 includes a radio resource control (RRC) layer.

Figure 1:
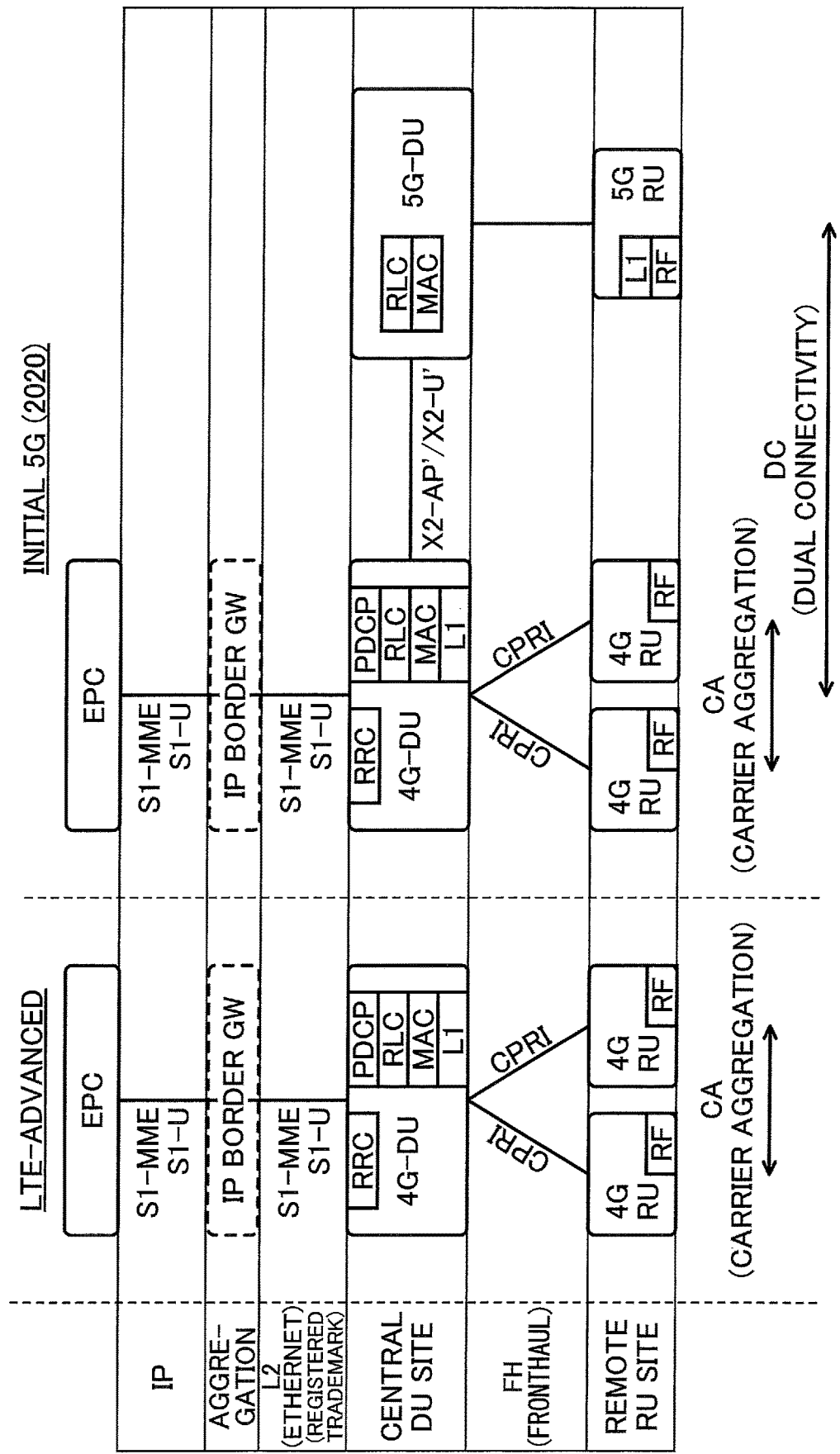
FIG. 1 is a diagram illustrating an exemplary C-RAN configuration which is under discussion in 5G.

Next, a C-RAN configuration which is under discussion in 5G will be described. In FIG. 1, a 4G-DU and a 4G-RU respectively represent a DU and an RU having LTE-A functions (including LTE functions). Further, a 5G-DU and a 5G-RU respectively represent a DU and an RU having fifth generation radio technology functions. The 4G-DU and the 5G-DU are connected through interfaces that are extensions of X2-AP and X2-U interfaces in LTE. Further, a network line connecting the DU with the RU is called a front haul (FH) and a common public radio interface (CPRI) is used for the FH in LTE.

In current LTE, the layer 1 (the physical layer: L1) functions and the layer 2 (MAC, RLC, and PDCP) functions are assumed to be implemented on the DU side. Therefore, a band necessary for the FH is about 16 times a peak rate supported by the DU. For example, if a system band is 20 MHz, and the DU supports radio communication of 2×2 Multi Input Multi Output (MIMO) (a maximum of 150 Mbps), a band necessary for the FH is about 2.4 Gbps.

In 5G which is currently under discussion, a peak rate of 10 Gbps or more and a lower delay are expected to be realized. Therefore, when 5G is introduced, the band necessary for the FH dramatically increases with the increase in the peak rate. In this regard, reducing an amount of information to be transmitted through the FH by implementing some layers in the DU on the RU side is under discussion. Many variations as to which layer function is to be implemented on the RU side can be considered. In some examples, a plan of implementing all or some of the layer 1 functions in the DU on the RU side, a plan of implementing some of the layer 1 functions and the layer 2 functions on the RU side, and so on are under discussion.

When some of the layer functions in the DU are implemented on the RU side, it is necessary for the DU and the RU to appropriately receive an uplink reference signal used for uplink quality measurement or the like. However, currently, in Third Generation Partnership Project (3GPP), an interface for receiving the uplink reference signal in the RU and an interface for transmitting measurement information calculated based on the uplink reference signal from the RU to the DU are not specified.

The technology of the disclosure enables the RU to receive an uplink reference signal and enables the DU to receive measurement information calculated based on the uplink reference signal in a radio communication network according to the C-RAN.

<System Configuration>

Figure 2:
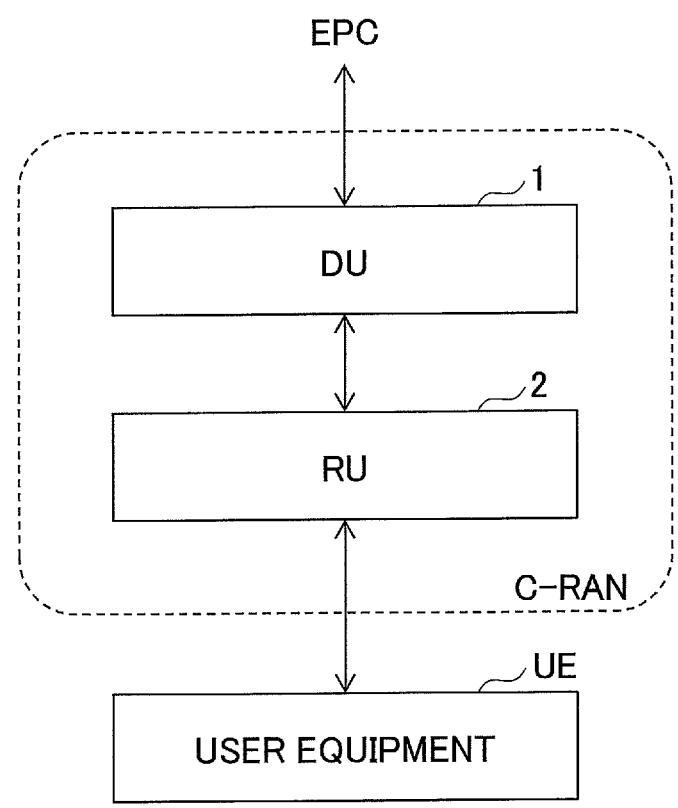
FIG. 2 is a diagram illustrating an exemplary system configuration of a radio communication system according to an embodiment of the present invention.

FIG. 2 is a diagram illustrating an exemplary system configuration of a radio communication system according to an embodiment of the present invention. As illustrated in FIG. 2, the radio communication system according to the present embodiment includes a DU 1, an RU 2, and a user equipment UE. The DU 1 and the RU 2 may be collectively referred to as a "radio base station" or a "radio base station system." One RU 2 is illustrated in FIG. 2, but two or more RUs 2 may be provided. In other words, the DU 1 may be configured to control a plurality of RUs 2.

The DU 1 may be referred to as a central digital unit, a baseband unit (BBU), or a central unit (CU). The DU 1 may be also referred to as a central aggregate station or a central base station or simply referred to as a base station (enhanced Node B (eNB)).

The RU 2 may be referred to as a remote radio unit (RRU), a remote antenna unit (RAU), or a remote radio head (RRH). The RU 2 may be also referred to as an extension station or a remote base station or simply referred to as a base station.

FIG. 2 illustrates an example in which the user equipment UE performs communication with one RU 2, but the user equipment UE can perform communication simultaneously using carriers of two or more RU 2 or a plurality of carriers of one RU 2. Communication simultaneously using a plurality of carriers with a predetermined bandwidth (a maximum of 20 MHz) as a basic unit is referred to as carrier aggregation (CA). A carrier serving as a basic unit in the carrier aggregation is referred to as a component carrier (CC).

When the CA is configured, a primary cell (PCell) which is a cell with high reliability for guaranteeing connectivity and a secondary cell (SCell) which is an additional cell are provided for the user equipment UE. The user equipment UE first connects to the PCell and can add the SCell as necessary. The PCell is a cell which is similar to an independent cell supporting radio link monitoring (RLM), semi-persistent scheduling (SPS), and so on. The SCell is a cell which is provided for the user equipment UE additionally to the PCell. Addition and deletion of the SCell are performed through radio resource control (RRC) signaling. The SCell is in a deactivation state immediately after being provided for the user equipment UE and thus has to be activated to be used for communication (scheduling).

It is necessary for the RU 2 to receive an uplink reference signal used for uplink quality measurement or the like from the user equipment UE and transmit information calculated based on the uplink reference signal to the DU 1. The uplink reference signal may be referred to as a sounding reference signal (SRS). The user equipment UE may transmit an SRS at periodic timing or aperiodic timing. An SRS which is periodically transmitted is referred to as a periodic SRS. An SRS which is aperiodically transmitted is referred to as an aperiodic SRS. The aperiodic SRS is transmitted according to a trigger given by the DU 1.

The SRS is used for reception quality measurement, timing adjustment, or the like which is necessary for applying frequency scheduling. For example, the SRS is used for uplink quality measurement for uplink adaptive modulation and coding (AMC) and link adaption of transmission power control, timing estimation for uplink timing control, timing advance (TA) command calculation, and the like, Fd estimation for measurement of a moving speed of the user equipment UE, estimation of a frequency offset in automatic frequency control (AFC), and so on.

In the radio communication system according to the present embodiment, some of the layer functions in the DU 1 can be implemented in the RU 2, and the RU 2 can receive an uplink reference signal from the user equipment UE and transmit measurement information calculated based on the uplink reference signal to the DU 1.

<Function-Sharing of DU and RU>

Figure 3:
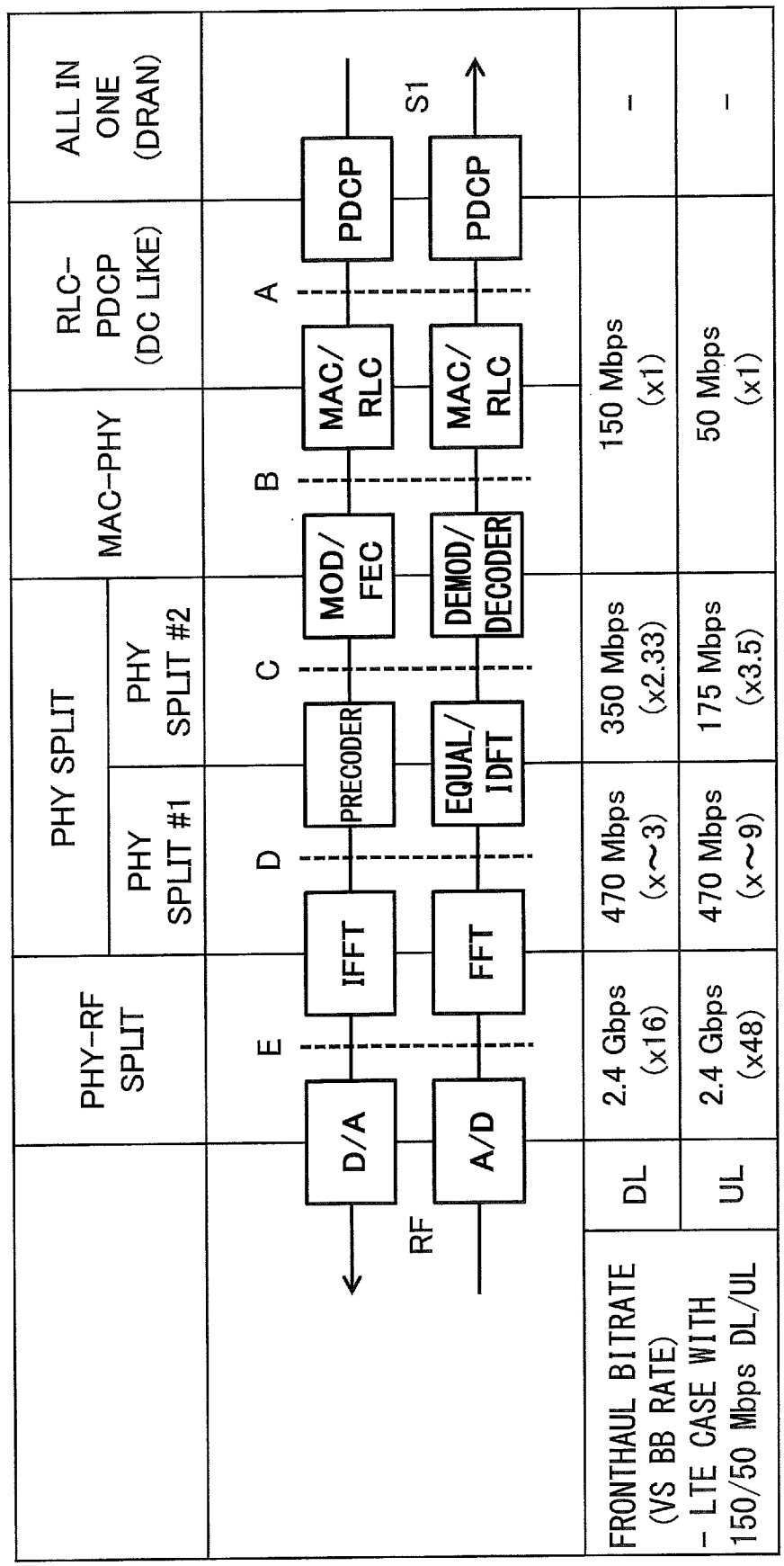
FIG. 3 is a diagram for describing function-sharing of a DU and an RU.

FIG. 3 is a diagram for describing exemplary function-sharing of the DU and the RU. Boundaries "A" to "E" in FIG. 3 represent boundaries of functions respectively implemented in the DU 1 and the RU 2. For example, in the case where function-sharing is performed at the boundary "B", it means that the functions of the layer 2 or higher are implemented on the DU 1 side, and the functions of the layer 1 are implemented on the RU 2 side. In the case where function-sharing is performed at the boundary "E", it corresponds to a configuration in which the functions of the layer 1 or higher are implemented on the DU 1 side, and the DU 1 and the RU 2 are connected using the CPRI.

FIG. 3 illustrates examples of bit rates necessary for the FH at the respective boundaries. For example, the DU 1 is assumed to support 150 Mbps (downlink (DL))/50 Mbps (uplink (UL)). In this case, when the function-sharing is performed at the boundary "A" or "B", the band necessary for the FH is 150 Mbps (DL)/50 Mbps (UL). Further, when the function-sharing is performed at the boundary "C", the band necessary for the FH is 350 Mbps (DL)/175 Mbps (UL). Similarly, when the function-sharing is performed at the boundary "D", the band necessary for the FH is 470 Mbps (DL)/470 Mbps (UL). Furthermore, when the function-sharing is performed at the boundary "E", the band necessary for the FH is 2.4 Gbps (DL)/2.4 Gbps (UL).

The radio communication system according to the present embodiment may be configured to support the function-sharing at any one of the boundaries "A" to "E" or may be configured to support the function-sharing at different boundaries for the UL and the DL.

<Processing Procedure>

Next, a processing procedure of receiving an uplink reference signal in a radio communication network according to the C-RAN will be described.

Figure 4:
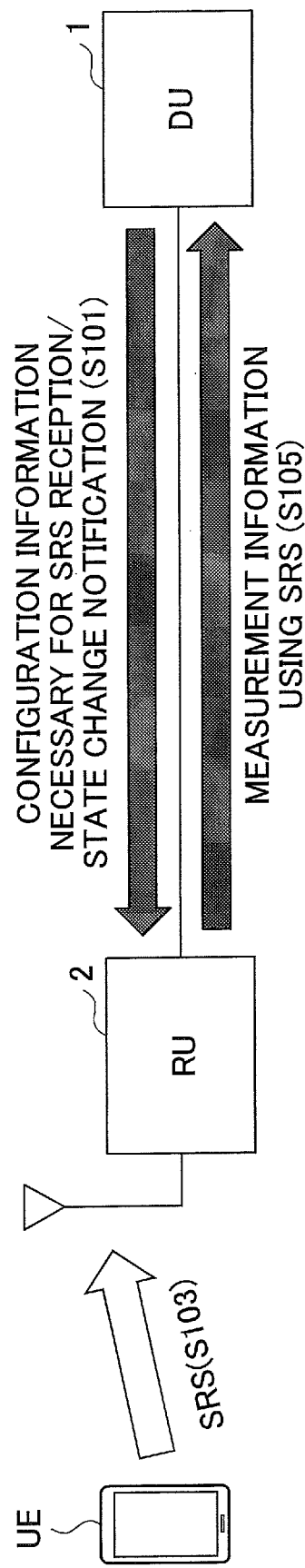
FIG. 4 is a diagram illustrating an example of a processing procedure of receiving an SRS.

FIG. 4 is a diagram illustrating an example of a processing procedure when an SRS is received. A processing procedure in which the RU 2 receives an SRS from the user equipment UE and calculates measurement information (for example, uplink quality measurement information, timing information, Fd information, or frequency offset information) based on the SRS, and transmits the measurement information to the DU 1 will be described with reference to FIG. 4.

First, the DU 1 provides configuration information for transmitting and receiving signals between the user equipment UE and the RU 2 (step S101). For example, the DU 1 provides resource information of an SRS to the RU 2 in advance as configuration information necessary for SRS reception. The resource information of the SRS indicates a resource used when the user equipment UE transmits the SRS, and includes a frequency band of a periodic SRS, a transmission period, a presence or absence of hopping, and so on. Further, the resource information of the SRS may include resource information (a frequency and a time) of a UL grant (a UL scheduling grant) in which the aperiodic SRS is triggered. Further, the DU 1 may provide to the RU 2, for example, whether simultaneous transmission of an ACK/NACK and an SRS is permitted, whether a measurement gap is set, whether DRX is set, or whether CA is configured, as the configuration information necessary for reception of the SRS.

The DU 1 may also provide a transmission mode, a duplex mode, CA configuration information, or the like of the user equipment UE to the RU 2, and the RU 2 may receive and store the configuration information.

The DU 1 may manage a state of the user equipment UE related to transmission of the SRS and may transmit a state change notification indicating a state change of the user equipment UE to the RU 2 when the state of the user equipment UE changes. Depending on the state of the user equipment UE (for example, a discontinuous reception (DRX) state, a time alignment (TA) timer state, or a CA state), the user equipment UE may not transmit an SRS. The state of the user equipment UE may be managed by the DU 1, and the DU 1 may transmit the state change notification to the RU 2 when the state changes.

For example, when DRX is set in the user equipment UE, since the user equipment UE does not transmit an SRS except in an active time, it is necessary for the RU 2 to recognize a DRX state of the user equipment UE. For example, the DU 1 may use a DRX timer (a DRX inactive timer) in order to manage a length of time until the user equipment UE enters the deactivation state after the completion of data transmission/reception. The DU 1 starts the DRX timer after data transmission/reception with the user equipment UE is completed. When data transmission/reception is performed before the DRX timer expires, the DRX timer is restarted. For determination of whether data transmission/reception is performed, it may be assumed that data transmission/reception is performed when an ACK is received for a downlink data channel or when a PUSCH can be actually received at the time of allocation of an uplink data channel. When the DRX timer expires, the user equipment UE does not transmit an SRS, and thus the DU 1 may transmit a timer expiration notification to the RU 2. Regardless of the DRX timer, when the DU 1 decides to cause the user equipment UE to transition to the deactivation state, an indication to transition to the deactivation state may be transmitted to the RU 2.

For example, since the user equipment UE releases a resource of an SRS when a TA timer expires, it is necessary for the RU 2 to detect a state of the TA timer of the user equipment UE. For example, the DU 1 may use a TA timer to manage a time elapsed after the user equipment UE receives a timing advance (TA) command. Since the UE restarts the TA timer each time a TA command is received, the DU 1 starts the TA timer when the TA command is transmitted to the user equipment UE and an ACK is received from the user equipment UE. When the ACK is received for the TA command from the user equipment UE before the TA timer expires, the TA timer is restarted. When the TA timer expires, since the user equipment UE releases the resource of the SRS and stops the transmission of the SRS, the DU 1 may transmit a timer expiration notification to the RU 2.

For example, when CA is configured in the user equipment UE, since the user equipment UE does not transmit an SRS to an SCell in a deactivation state, it is necessary for the RU 2 to detect a CA state of the user equipment UE. For example, the DU 1 may use an SCell deactivation timer (sCellDeactivationTimer) to manage a length of time until the SCell provided for the user equipment UE is transitioned to the deactivation state after being set to the activation state. The DU 1 starts the SCell deactivation timer when the SCell provided for the user equipment UE is set to the activation state. When data transmission/reception in the SCell is performed before the SCell deactivation timer expires, the SCell deactivation timer is restarted. For determination of whether data transmission/reception is performed, it may be assumed that data transmission/reception is performed when an ACK is received for a downlink data channel or when a PUSCH can be actually received at the time of allocation of an uplink data channel. When the SCell deactivation timer expires, the user equipment UE does not transmit an SRS, and thus the DU 1 may transmit a timer expiration notification to the RU 2. Regardless of the SCell deactivation timer, when the DU 1 decides to deactivate the SCell of the user equipment UE, an indication to transition to the deactivation state may be transmitted to the RU 2.

In this example, the state of the user equipment UE is managed by the DU 1, but the state of the user equipment UE may be managed by the RU 2.

Then, the RU 2 determines allocation of a resource used when the user equipment UE transmits an SRS, and makes an attempt to receive the SRS based on a determination result (step S103). For example, the RU 2 determines allocation of the resource in which the SRS is transmitted based on the configuration information (the frequency band of the periodic SRS, the transmission period, the presence or absence of hopping, and so on) which is provided from the DU 1 in advance and makes an attempt to receive the SRS periodically at the reception timing of the SRS. When an aperiodic SRS is triggered, since the RU 2 receives an UL grant from the DU 1, the RU 2 determines allocation of a resource in which the SRS is transmitted based on the UL grant and makes an attempt to receive the SRS at the reception timing of the SRS.

For example, when simultaneous transmission of an ACK/NACK and an SRS is not permitted, the user equipment UE does not transmit an SRS at the transmission timing of an ACK/NACK. Since the RU 2 receives scheduling information of a physical downlink shared channel (PDSCH) from the DU 1, it is possible to determine the reception timing of the ACK/NACK from the user equipment UE, and it is possible to determine whether to receive an SRS from the user equipment UE accordingly.

For example, when a measurement gap is set, the user equipment UE does not transmit an SRS in a measurement gap interval. The RU 2 can determine whether to receive an SRS from the user equipment UE by receiving configuration information about whether the measurement gap is set from the DU 1.

For example, when DRX is set, the user equipment UE does not transmit an SRS except in an active time. As described above, the RU 2 can determine whether to receive an SRS from the user equipment UE based on the DRX state of the user equipment UE managed by the DU 1 or the RU 2.

For example, when a TA timer expires, the user equipment UE releases a resource of an SRS and does not transmit the SRS. As described above, the RU 2 can determine whether to receive an SRS from the user equipment UE based on the state of the TA timer of the user equipment UE managed by the DU 1 or the RU 2.

For example, when CA is configured, the user equipment UE does not transmit an SRS to an SCell in the deactivation state. As described above, the RU 2 can determine SRS reception from the user equipment UE based on the CA state of the user equipment UE managed by the DU 1 or RU 2.

Then, when the RU 2 receives the SRS from the user equipment UE, the RU 2 calculates measurement information based on the SRS and transmits the measurement information to the DU 1 (step S105). The DU 1 receives the measurement information from the RU 2. For example, the RU 2 calculates uplink quality measurement information, timing information, Fd information, frequency offset information, or the like based on the SRS. The RU 2 may transmit the measurement information along with identification information of the user equipment UE to the DU 1, and the DU 1 may receive the measurement information along with the identification information of the user equipment UE from RU 2.

The RU 2 may multiplex a plurality of pieces of measurement information into one format and transmit the multiplexed measurement information to the DU 1. In this case, the measurement information multiplexed into one format may include a plurality of kinds of measurement information of the user equipment UE or measurement information of a plurality of the user equipments UEs. Further, the measurement information multiplexed into one format may include measurement information of a plurality of subframes. The format of the measurement information will be described below in further detail.

Next, a state management of the user equipment UE in the case of CA will be further described.

Figure 5:
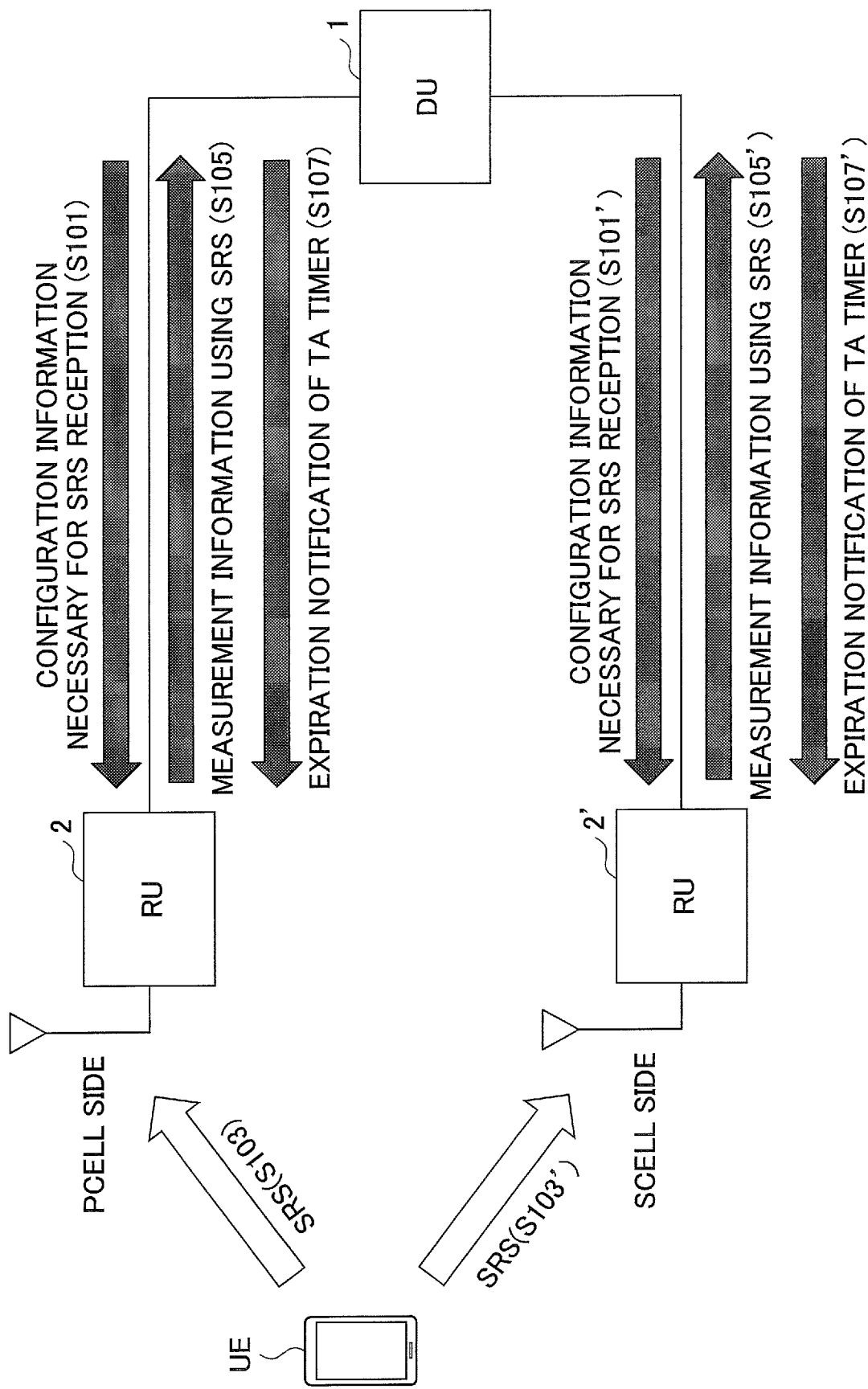
FIG. 5 is a diagram illustrating an example of a processing procedure of receiving an SRS (in the case of CA)

FIG. 5 is a diagram illustrating an example of a processing procedure of receiving an SRS in the case of CA. When CA is configured in the user equipment UE, it is necessary for both a PCell and an SCell to recognize the state of the user equipment UE. When the PCell and the SCell are provided by the same RU 2, the RU 2 can simultaneously detect the state of the user equipment UE with respect to the PCell and the state of the user equipment UE with respect to the SCell. However, when the PCell and the SCell are provided by different RUs, that is, RU 2 and RU 2' as illustrated in FIG. 5, the state of the user equipment UE with respect to the RU 2 of the PCell needs to be recognized by the RU 2' of the SCell as well. Similarly, the state of the user equipment UE with respect to the RU 2' of the SCell needs to be recognized by the RU 2 of the PCell as well. The management of the state of the user equipment UE may be performed in the DU 1, the RU 2, or the RU 2'.

An example in which the state of the TA timer of the user equipment UE is managed by the DU 1, and the state change of the TA timer of the user equipment UE is provided to the RU 2 and the RU 2' will be described.

As described above with reference to FIG. 4, the DU 1 provides configuration information for transmitting and receiving signals between the user equipment UE and the RU 2 (step S101). Similarly, the DU 1 provides configuration information for transmitting and receiving signals between the user equipment UE and the RU 2' (step S101').

Then, the RU 2 determines allocation of a resource used when the user equipment UE transmits an SRS, and makes an attempt to receive the SRS based on a determination result (step S103). Similarly, the RU 2' determines allocation of a resource used when the user equipment UE transmits an SRS, and makes an attempt to receive the SRS based on a determination result (step S103'). When the RU 2 and the RU 2' receive the SRS from the user equipment UE, the RU 2 and the RU 2' calculate measurement information based on the SRS and transmit the measurement information to the DU 1 (steps S105 and S105').

As described above, when the TA timer expires, the user equipment UE releases the resource of the SRS and does not transmit the SRS. The DU 1 may use the TA timer to manage a time elapsed after the user equipment UE receives a TA command. Since the UE restarts the TA timer each time a TA command is received, the DU 1 starts the TA timer when the TA command is transmitted to the user equipment UE and an ACK is received from the user equipment UE. When the ACK is received from the user equipment UE for the TA command before the TA timer expires, the TA timer is restarted. When the TA timer expires, since the user equipment UE releases the resource of the SRS and stops the transmission of the SRS, the DU 1 transmits a timer expiration notification to the RU 2 and RU 2' (steps S107 and S107'). The RU 2 and the RU 2' can determine that the user equipment UE does not transmit the SRS when the expiration notification of the TA timer is received from the DU 1.

In this example, the state of the TA timer of the user equipment UE is managed by the DU 1, but the state of the TA timer of the user state UE may be managed by the RU 2 or the RU 2'. In the case where the RU 2 manages the state of the TA timer, when the RU 2 detects the expiration of the TA timer, the RU 2 stops the SRS reception process and notifies the DU 1 of the expiration of the TA timer. When the DU 1 receives the expiration of the TA timer from the RU 2, the DU 1 notifies the RU 2' on the other side of the expiration of the TA timer. The same applies to the case where the RU 2' manages the state of the TA timer.

In FIG. 5, the state management of the TA timer of the user equipment UE in the case of CA has been described above, but the state management of the DRX timer of the user equipment UE in the case of CA can be similarly implemented by managing the DRX timer (the DRX inactive timer) in the DU 1, the RU 2, or the RU 2'. Further, the management of the CA state of the user equipment UE in the case of CA can be similarly implemented by managing the SCell deactivation timer (sCellDeactivationTimer) in the DU 1, the RU 2, or the RU 2'.

Further, in the case of CA in different RUs, that is, the RU 2 and the RU 2', when simultaneous transmission of an ACK/NACK and an SRS is not permitted, the RU 2 (or the RU 2') needs to recognize PDSCH transmission in the RU 2' (or RU 2) on the other side. For example, when PDSCH transmission is performed in the RU 2', the user equipment UE does not transmit an SRS at the transmission timing of an ACK/NACK for the PDSCH transmission. Therefore, when PDSCH transmission is to be performed in the RU 2', the DU 1 provides downlink scheduling information to the RU 2 in addition to the RU 2'. When a PUSCH from the RU 2' is to be received, the DU 1 may provide uplink scheduling information to the RU 2 in addition to the RU 2'. The RU 2 receives the scheduling information with respect to the RU 2' from the DU 1 and determines whether to receive an SRS.

<Format of Measurement Information>

Next, a format of measurement information transmitted from the RU 2 to the DU 1 will be described.

Figure 6:
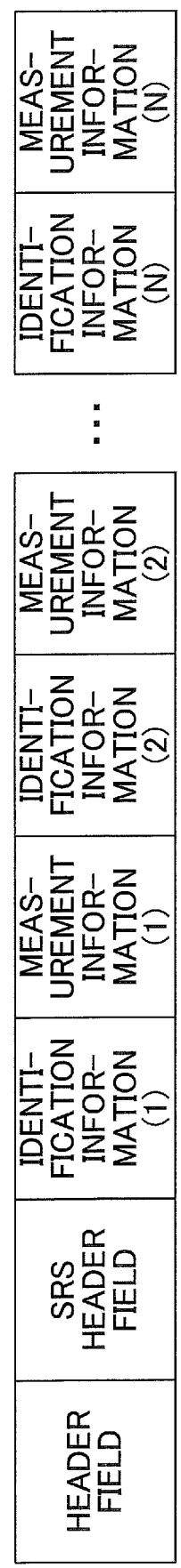
FIG. 6 is a diagram illustrating an example of a format of measurement information transmitted between a DU and an RU.

FIG. 6 is a diagram illustrating an example of a format of measurement information transmitted between the DU 1 and the RU 2. Information to be transmitted from the RU 2 to the DU 1 includes identification information identifying the user equipment UE corresponding to the measurement information and measurement information (for example, uplink quality measurement information, timing information, Fd information, or frequency offset information) calculated based on the SRS. Further, the information to be transmitted from the RU 2 to the DU 1 may include SRS reception timing associated with the measurement information (for example, a hyper frame number (HFN), a system frame number (SFN), or a subframe number).

The measurement information format may include measurement information calculated in one subframe or measurement information calculated in a plurality of subframes. When measurement information calculated in a plurality of subframes is collectively transmitted in one format, a format in which measurement information is repeated for each subframe may be used. Further, measurement information may be transmitted to the DU 1 at each SRS reception timing or may be transmitted to the DU 1 with certain periodicity.

As illustrated in FIG. 6, the measurement information format includes a header field indicating what kind of information is transmitted in this format. In the present embodiment, the header field includes information indicating the measurement information of the SRS.

Further, the measurement information format includes an SRS header field indicating a subsequent measurement information configuration. For example, the SRS header field includes the number of pieces of identification information to be multiplexed (the number of user equipments UEs multiplexed in one format). Further, the SRS header field may include a bit length. When the bit length can be identified according to a configuration state of each the user equipment UE, the bit length may not be included. Alternatively, a bit field that is assumed to be a maximum size may be prepared, and information on the bit length may be omitted. Alternatively, a subheader may be provided for measurement information of each UE, and the bit length may be included in the subheader.

Further, the measurement information format includes the identification information of the user equipment UE. The identification information of the user equipment UE is information indicating the user equipment UE corresponding to subsequent measurement information. A cell-radio network temporary identifier (C-RNTI) or a semi-persistent scheduling C-RNTI (SPS C-RNTI) may be used as the identification information of the user equipment UE. Alternatively, a SAE temporary mobile subscriber identity (S-TMSI) or an international mobile subscriber identity (IMSI) may be used, an SRS configuration index which is a resource index of the SRS may be used, or identification information allocated by the base station eNB may be used.

For example, when the identification information such as a C-RNTI overlaps in the case of CA, in order to make the identification information of the user equipment UE unique, a cell identifier such as a physical cell identifier (PCI) or an E-UTRAN cell global identifier (ECGI) may additionally be used as associated information, or carrier information such as a carrier frequency or a carrier number may additionally be used as associated information.

Furthermore, the measurement information format includes the measurement information. For example, the measurement information may include one or more of uplink quality measurement information measured based on the SRS (signal to interference ratio (SIR) information), timing information measured based on the SRS, Fd information measured based on the SRS, and frequency offset information measured based on the SRS.

For example, the SIR information measured based on the SRS may be an SIR of the entire reception band or may be an SIR of a subband obtained by dividing the reception band into predetermined subbands. When the SIR of the subband is provided, the number of bits may be reduced by reporting a quantized offset value based on an average value of the entire reception band. Further, signal power (S) and interference power (I) may be separately reported as the SIR information. Further, the SIR information may be an average value obtained by averaging SIR information in a certain interval. Further, the SIR information may be not an actual measurement value and may be a quantized value quantized using a table, for example. Further, when reliability of the received SRS is determined to be low based on an indicator such as the SIR, for example, the SIR information may be treated as information indicating that it was unable to perform reception.

For example, the timing information measured based on the SRS may be an absolute value of measurement timing or may be a value of a TA command which the base station eNB actually transmits to the user equipment UE.

For example, the Fd information measured based on SRS may be an estimated moving speed or may be a predetermined quantized value (for example, a low speed, a middle speed, a high speed, or the like).

For example, the offset information measured based on the SRS may be an absolute value of an estimated offset or may be a predetermined quantized value.

FIG. 7 is a diagram illustrating a specific example of measurement information transmitted between the DU and the RU (1/2). FIG. 7 illustrates an example in which a C-RNTI is used as identification information of a user equipment, and measurement information of a user equipment UE indicated by a C-RNTI #100 and measurement information of a user equipment UE indicated by a C-RNTI #200 are reported together. In this case, information "the number of identification information items: 2" indicating that measurement information of two user equipments is multiplexed is included in the SRS header field. SIR=10 dB, TA command=31, and Fd=low are included in the measurement information of the user equipment UE of the C-RNTI #100, and SIR=15 dB, TA command=33, and Fd=Middle are included in the measurement information of the user equipment UE of the C-RNTI #200.

Figure 8:
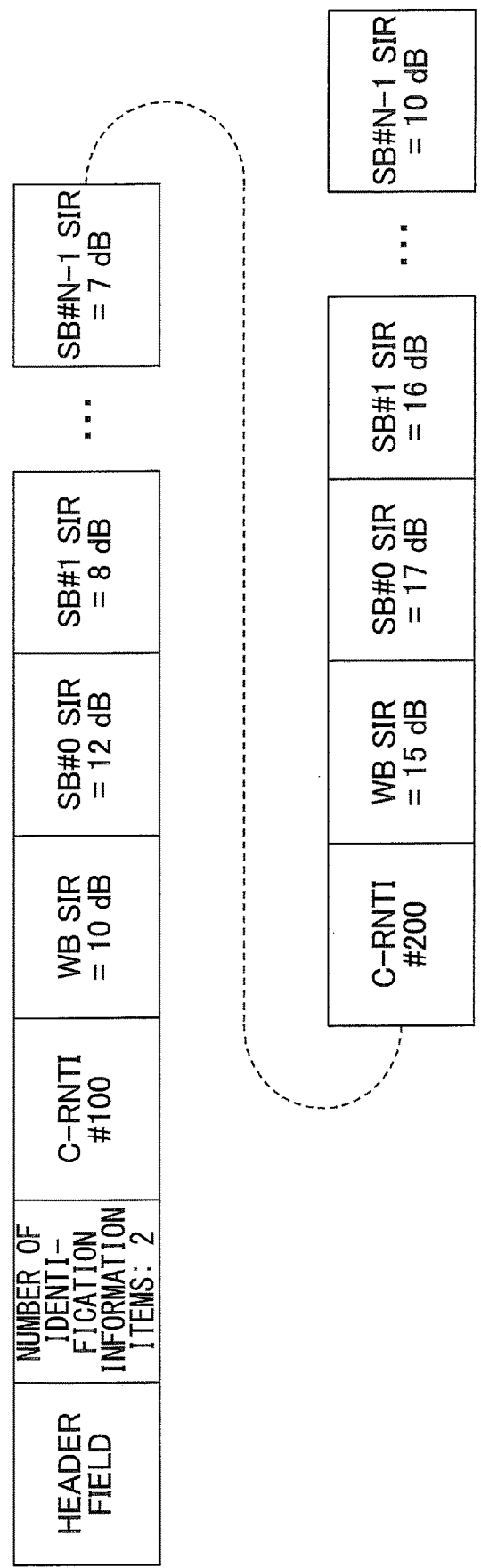
FIG. 8 is a diagram illustrating a specific example of measurement information transmitted between a DU and an RU (2/2)

FIG. 8 is a diagram illustrating a specific example of measurement information transmitted between the DU and the RU (2/2). FIG. 8 illustrates an example in which a C-RNTI is used as identification information of a user equipment, and measurement information of a user equipment UE indicated by a C-RNTI #100 and measurement information of a user equipment UE indicated by a C-RNTI

200 are reported together. In this case, information "the number of identification information items: 2" indicating that measurement information of two user equipments is multiplexed is included in the SRS header field. SIR of entire reception band=10 dB, and SIR of subband #0=12 dB, SIR of subband #1=8 dB, . . . , and SIR of subband # N−1=7 dB in the entire reception band are included in the measurement information of the user equipment UE of the C-RNTI #100, and SIR of entire reception band=15 dB, and SIR of subband #0=17 dB, SIR of subband #1=16 dB, . . . , and SIR of subband # N−1=10 dB in the entire reception band are included in the measurement information of the user equipment of the C-RNTI #200.

<Functional Configuration>

Figure 9:
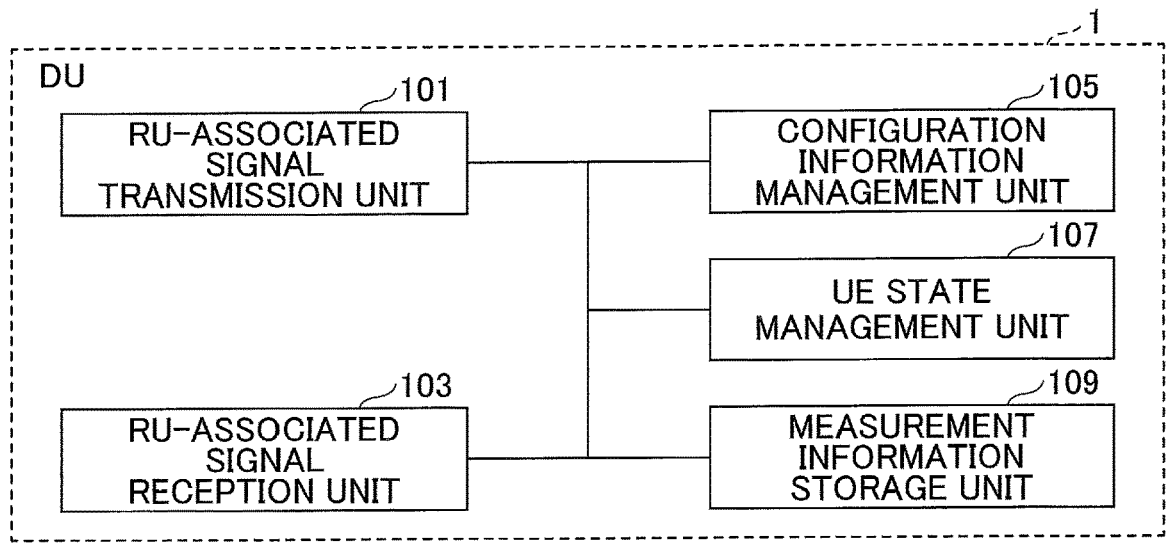
FIG. 9 is a diagram illustrating an exemplary functional configuration of a DU according to an embodiment of the present invention.

FIG. 9 is a diagram illustrating an exemplary functional configuration of the DU according to an embodiment of the present invention. As illustrated in FIG. 9, the DU 1 includes an RU-associated signal transmission unit 101, an RU-associated signal reception unit 103, a configuration information management unit 105, a UE state management unit 107, and a measurement information storage unit 109. FIG. 9 illustrates only functional units of the DU 1 particularly related to the embodiment of the present invention, and functions (not illustrated) of performing operations at least complying with LTE/LTE-A (including 5G) are also provided. Further, the functional configuration illustrated in FIG. 9 is merely an example. Any functional classification and any functional unit name can be used as long as the operation according to the present embodiment can be performed. It should be noted that a part of the processes of the DU 1 described above (for example, only one or more specific modified examples, specific examples, or the like) may be performed.

The RU-associated signal transmission unit 101 has a function of generating a signal by performing the processes of the respective layers on data to be transmitted from the DU 1 and transmitting the generated signal to the RU 2 via the FH. The RU-associated signal reception unit 103 has a function of receiving a signal from the RU 2 via the FH and acquiring data by performing the processes of the respective layers on the received signal. Each of the RU-associated signal transmission unit 101 and the RU-associated signal reception unit 103 has a function as an interface according to a predetermined protocol used in the FH. When CA is configured in the user equipment UE, the RU-associated signal transmission unit 101 transmits downlink scheduling information or uplink scheduling information to the RU 2' (or RU 2) on the other side in addition to the RU 2 (or the RU 2') corresponding to a CC in which data is transmitted or received.

In order to enable the RU 2 to receive an SRS from the user equipment UE, the RU-associated signal transmission unit 101 may transmit configuration information necessary for SRS reception (including resource information of the SRS) to the RU 2. Further, when the state of the user equipment UE concerning the transmission of the SRS is managed by the DU 1, the RU-associated signal transmission unit 101 may provide the state change of the user equipment UE to the RU 2. When uplink CA is configured between the user equipment UE and a plurality of RUs, that is, the RU 2 and the RU 2', the state change of the user equipment UE may be provided to the plurality of RUs, that is, the RU 2 and the RU 2'.

Further, the RU-associated signal reception unit 103 receives measurement information calculated by the RU 2 based on the SRS transmitted from the user equipment UE. For example, the measurement information may be transmitted along with the identification information of the user equipment UE according to the format described above with reference to FIG. 6.

The configuration information management unit 105 manages the configuration information for transmission and reception of signals between the user equipment UE and the RU 2. For example, the configuration information management unit 105 may manage a frequency band of a periodic SRS, a transmission period, a presence or absence of hopping, and so on or may manage resource information of an aperiodic SRS allocated by a scheduler. Further, the configuration information management unit 105 may determine whether simultaneous transmission of an ACK/NACK and an SRS is permitted, whether a measurement gap is set, whether DRX is set, or whether CA is configured, as the configuration information necessary for reception of the SRS.

When the state of the user equipment UE related to the transmission of the SRS is managed by the DU 1, the UE state management unit 107 manages the state of the user equipment UE related to the transmission of the SRS. For example, the UE state management unit 107 may manage a DRX state, a state of a TA timer, or a CA state.

The measurement information storage unit 109 stores the measurement information received through the RU-associated signal reception unit 103. The measurement information may be used for frequency scheduling, timing adjustment, or the like.

Figure 10:
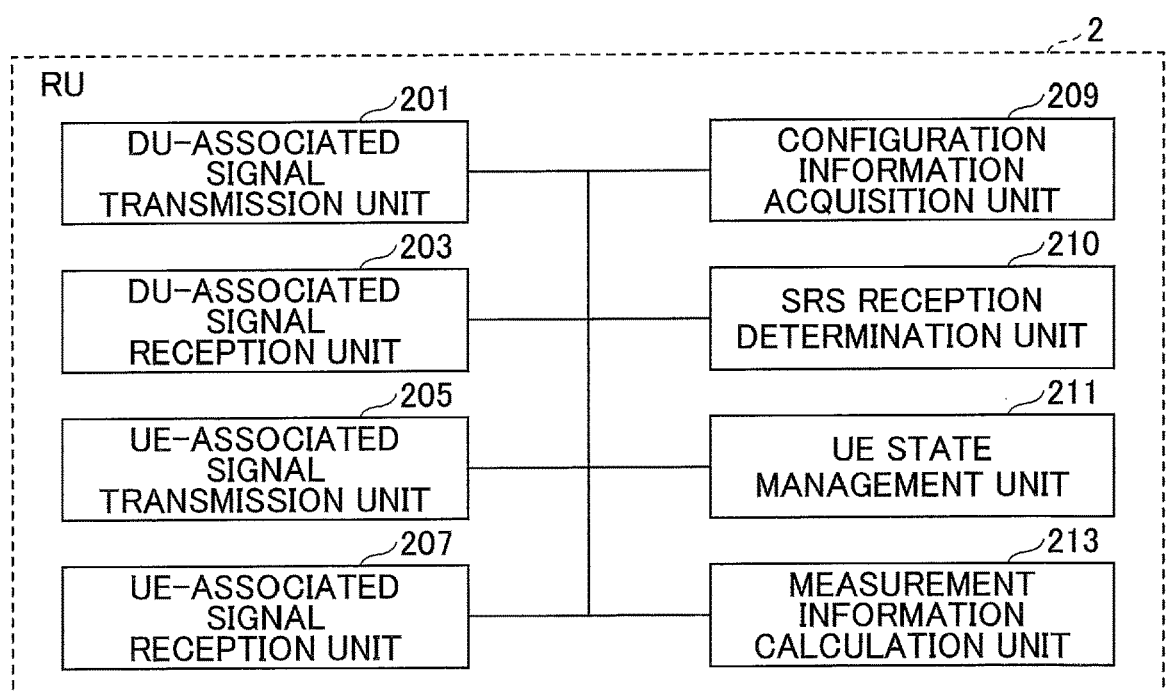
FIG. 10 is a diagram illustrating an exemplary functional configuration of an RU according to an embodiment of the present invention.

FIG. 10 illustrates an exemplary functional configuration of the RU according to an embodiment of the present invention. As illustrated in FIG. 10, the RU 2 includes a DU-associated signal transmission unit 201, a DU-associated signal reception unit 203, a UE-associated signal transmission unit 205, a UE-associated signal reception unit 207, a configuration information acquisition unit 209, an SRS reception determination unit 210, a UE state management unit 211, and a measurement information calculation unit 213. FIG. 10 illustrates only functional units of the RU 2 particularly related to the embodiment of the present invention, and functions (not illustrated) of performing operations at least complying with LTE/LTE-A (including 5G) are also provided. Further, the functional configuration illustrated in FIG. 10 is merely an example. Any functional classification and any functional unit name can be used as long as the operation according to the present embodiment can be performed. It should be noted that a part of the processes of the RU 2 described above (for example, only one or more specific modified examples, specific examples, or the like) may be performed.

The DU-associated signal transmission unit 201 has a function of generating a signal by performing the processes of the respective layers on data to be transmitted from the RU 2 and transmitting the generated signal to the DU 1 via the FH. The DU-associated signal reception unit 203 has a function of receiving a signal from the DU 1 via the FH and acquiring data by performing the processes of the respective layers on the received signal. Each of the DU-associated signal transmission unit 201 and the DU-associated signal reception unit 203 has a function as an interface according to a predetermined protocol used in the FH.

In order to enable the RU 2 to receive an SRS from the user equipment UE, the DU-associated signal reception unit 203 may receive configuration information necessary for SRS reception (including resource information of the SRS) from the DU 1. Further, when the state of the user equipment UE concerning the transmission of the SRS is managed by the DU 1, the DU-associated signal reception unit 203 may receive the state change of the user equipment UE from the DU 1.

Further, the DU-associated signal transmission unit 201 transmits to the DU 1 measurement information calculated based on the SRS transmitted from the user equipment UE. For example, the measurement information may be transmitted along with the identification information of the user equipment UE according to the format described with reference to FIG. 6.

The UE-associated signal transmission unit 205 has a function of transmitting a radio signal including data and control information to be transmitted to the user equipment UE. The UE-associated signal reception unit 207 has a function of receiving a radio signal from the user equipment UE. The radio signal received from the user equipment UE includes the SRS in addition to data and the control information.

The configuration information acquisition unit 209 acquires the configuration information for transmission and reception of signals between the user equipment UE and the RU 2 from the DU 1. For example, the configuration information acquisition unit 209 may acquire a frequency band of a periodic SRS, a transmission period, a presence or absence of hopping, and so on or may acquire resource information of an aperiodic SRS allocated by a scheduler. Further, the configuration information acquisition unit 209 may acquire whether simultaneous transmission of an ACK/NACK and an SRS is permitted, whether a measurement gap is set, whether DRX is set, or whether CA is configured, as the configuration information necessary for reception of the SRS.

The SRS reception determination unit 210 determines allocation of a resource used when the user equipment transmits an SRS and whether to receive an SRS. The allocation of the resource used when the user equipment UE transmits the SRS may be determined based on the configuration information acquired from the DU 1 through the configuration information acquisition unit 209. Further, whether to receive the SRS may be determined based on the state change of the user equipment.

When the state of the user equipment UE related to the transmission of the SRS is managed in the RU 2, the UE state management unit 211 manages the state of the user equipment UE related to the transmission of the SRS. For example, the UE state management unit 211 may manage a DRX state, a state of a TA timer, or a CA state. Further, when CA is configured together with a different RU 2', the state change of the user equipment UE may be provided to the different RU 2' via the DU 1.

The measurement information calculation unit 213 calculates measurement information based on the SRS. The measurement information is transmitted to the DU 1 through the DU-associated signal transmission unit 201.

The entire configuration of each of the DU 1 and the RU 2 described above may be implemented entirely by a hardware circuit (for example, one or more IC chips), or a part of the configuration of each of the DU 1 and the RU 2 may be implemented by a hardware circuit, and the other parts may be implemented by a CPU and a program.

<Hardware Configuration>

Figure 11:
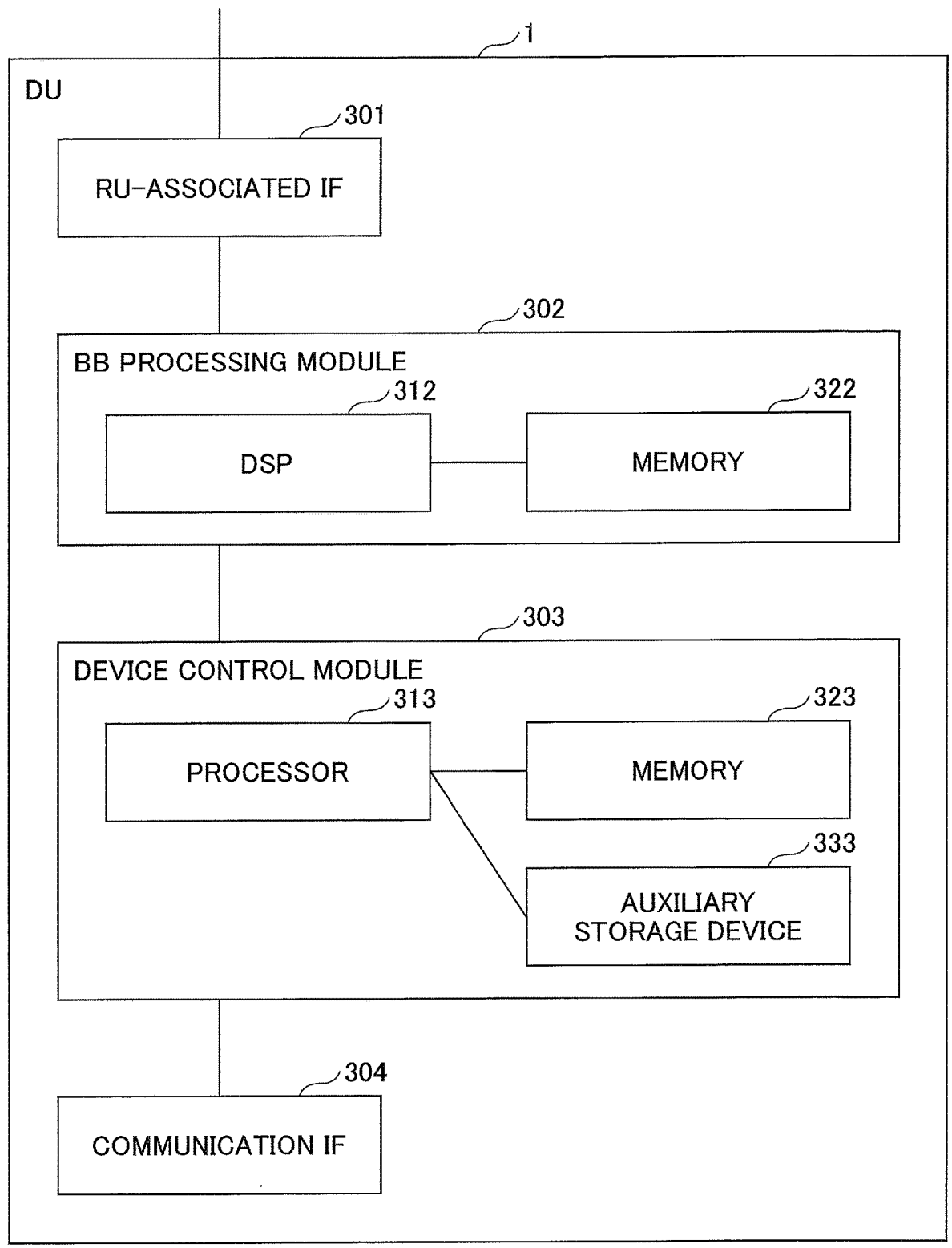
FIG. 11 is a diagram illustrating an exemplary hardware configuration of a DU according to an embodiment of the present invention.

FIG. 11 is a diagram illustrating an exemplary hardware configuration of the DU according to an embodiment of the present invention. FIG. 11 illustrates a configuration that is closer to an implementation example than FIG. 9. As illustrated in FIG. 11, the DU 1 includes an RU-associated IF 301 which is an interface for connection with the RU 2, a base band (BB) processing module 302 that performs baseband signal processing, a device control module 303 that performs processing of a higher layer or the like, and a communication I/F 304 which is an interface for connection with a core network or the like.

The RU-associated IF 301 has a function of connecting a physical line of the FH connecting between the DU 1 and the RU 2 and a function of terminating a protocol used in the FH. The RU-associated IF 301 includes, for example, a part of the RU-associated signal transmission unit 101 and a part of the RU-associated signal reception unit 103 illustrated in FIG. 9.

The BB processing module 302 performs a process of converting an IP packet into a signal transmitted/received to/from the RU 2 and vice versa. A digital signal processor (DSP) 312 is a processor that performs signal processing in the BB processing module 302. A memory 322 is used as a work area of the DSP 312. The BB processing module 302 includes, for example, a part of the RU-associated signal transmission unit 101 and a part of the RU-associated signal reception unit 103 illustrated in FIG. 9.

The device control module 303 performs protocol processing of the IP layer, operation and maintenance (OAM) processing, and so on. A processor 313 is a processor that performs processing performed by the device control module 303. A memory 323 is used as a work area of the processor 313. An auxiliary storage device 333 is, for example, an HDD or the like, and stores various kinds of configuration information or the like for an operation of the DU 1. The device control module 303 includes, for example, the configuration information management unit 105, the UE state management unit 107, and the measurement information storage unit 109 illustrated in FIG. 9.

Figure 12:
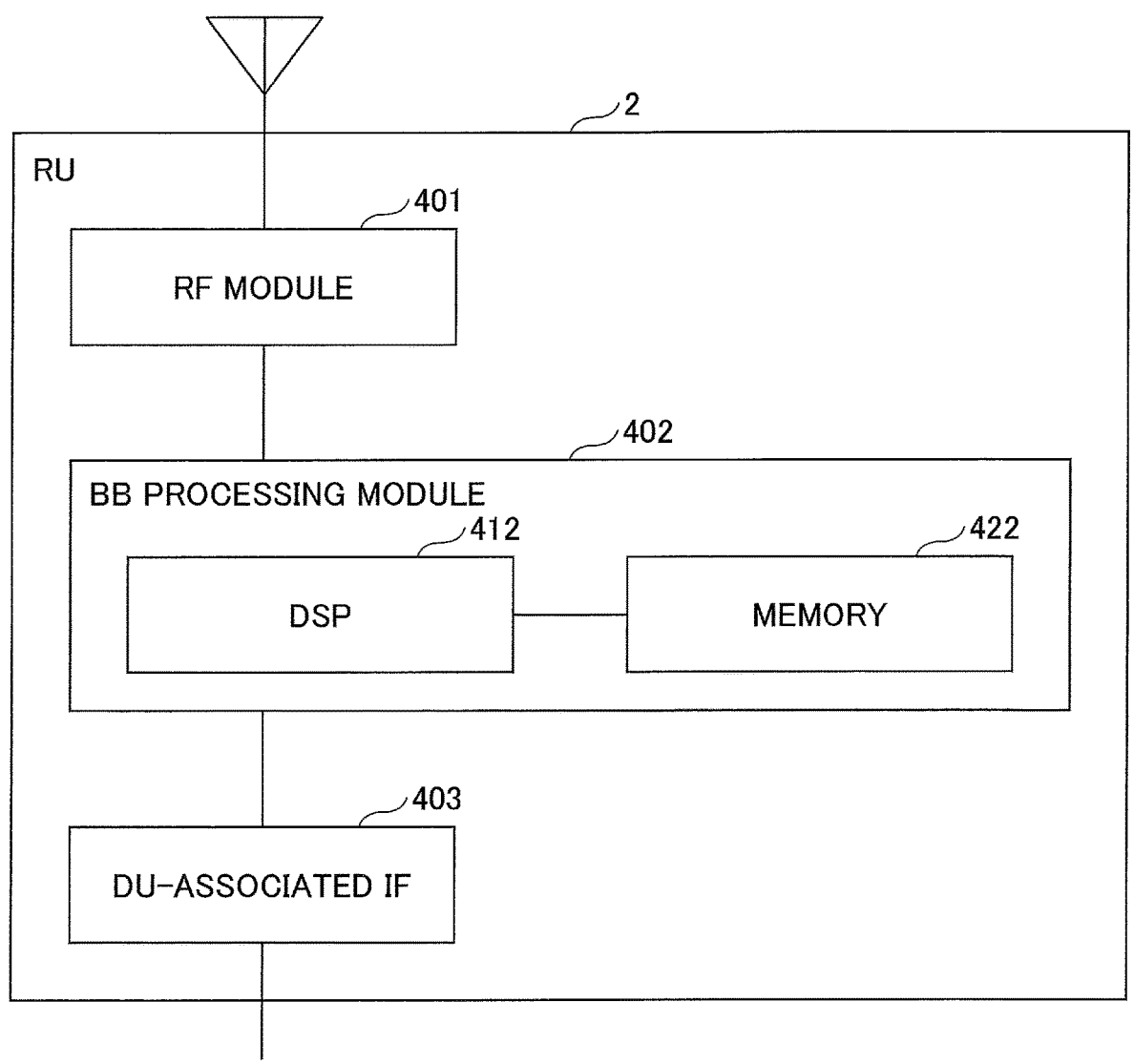
FIG. 12 is a diagram illustrating an exemplary hardware configuration of an RU according to an embodiment of the present invention.

FIG. 12 is a diagram illustrating an exemplary hardware configuration of the RU according to an embodiment of the present invention. FIG. 12 illustrates a configuration that is closer to an implementation example than FIG. 10. As illustrated in FIG. 12, the RU 2 includes a radio frequency (RF) module 401 that performs processing relating to a radio signal, a base band (BB) processing module 402 that performs baseband signal processing, and a DU-associated IF 403 which is an interface for connection with the DU 1.

The RF module 401 performs digital-to-analog (D/A) conversion, modulation, frequency transformation, power amplification, and the like on a digital baseband signal received from the BB processing module 402 and generates a radio signal to be transmitted through an antenna. Further, the RF module 401 performs frequency transformation, analog to digital (A/D) conversion, demodulation, and the like on a received radio signal, generates a digital baseband signal, and transfers the digital baseband signal to the BB processing module 402. The RF module 401 has an RF function. The RF module 401 includes, for example, the UE-associated signal transmission unit 205 and the UE-associated signal reception unit 207 illustrated in FIG. 10.

The BB processing module 402 performs a process of converting a signal transmitted/received to/from the DU 1 via the DU-associated IF 403 into a digital baseband signal and vice versa. A digital signal processor (DSP) 412 is a processor that performs signal processing in the BB processing module 402. A memory 422 is used as a work area of the DSP 412. The BB processing module 402 includes, for example, the configuration information acquisition unit 209, the SRS reception determination unit 210, the UE state management unit 211, and the measurement information calculation unit 213 illustrated in FIG. 10.

The DU-associated IF 403 has a function of connecting the physical line of the FH connecting between the DU 1 and the RU 2 and a function of terminating a protocol used in the FH. The DU-associated IF 403 includes, for example, the DU-associated signal transmission unit 201 and the DU-associated signal reception unit 203 illustrated in FIG. 10.

<Effects of Embodiment of Present Invention>

As described above, according to an embodiment of the present invention, it is possible to implement some of the layer functions in the DU 1 on the RU 2, receive an uplink reference signal from the user equipment UE by the RU 2, and transmit measurement information calculated based on the uplink reference signal from the RU 2 to the DU 1 in a radio communication network according to the C-RAN.

The DU 1 provides resource information of the SRS to the RU 2 in advance, and thus the RU 2 can recognize the reception timing of the SRS. On the other hand, the user equipment UE does not transmit an SRS depending on the state of the user equipment UE. When the state is managed by the DU 1 or the RU 2 and the RU 2 detects the state of the user equipment UE, the RU 2 can determine whether to receive an SRS. Accordingly, the RU 2 can receive an SRS at an appropriate timing. The state of the user equipment UE may be managed by the RU 2, but when CA is configured by a plurality of RUs, that is, the RU 2 and the RU 2', it may be centrally managed by the DU 1. By the central management by the DU 1, the state of the user equipment UE related to the transmission of the SRS can be appropriately provided to the plurality of RUs, that is, the RU 2 and the RU 2'.

Further, when the RU 2 transmits the measurement information to the DU 1, the measurement information of a plurality of user equipments UEs or measurement information of a plurality of subframes can be collectively transmitted. Accordingly, it is possible to reduce the band necessary for the FH. Further, instead of a measured absolute value, a quantized value or the like can be used as the measurement information, and it is possible to further reduce the number of bits necessary for the measurement information by using the quantized value or the like.

<Supplement>

The configuration of each of the devices (the DU 1 and the RU 2) described above in the embodiment of the present invention may be implemented in the device having a CPU (processor) and a memory such that a program is executed by the CPU, may be implemented by hardware such as a hardware circuit equipped with a processing logic described in the present embodiment, or may be implemented by a combination of a program and hardware.

The exemplary embodiment of the present invention has been described above, but the disclosed invention is not limited to the above embodiment, and those skilled in the art would understand that various modified examples, revised examples, alternative examples, substitution examples, and so on can be made. In order to facilitate understanding of the invention, specific numerical value examples have been used for description, but the numerical values are merely examples, and any suitable values may be used unless otherwise stated. The classification of items in the above description is not essential to the present invention. Matters described in two or more items may be combined and used as necessary, and a matter described in one item may be applied to a matter described in another item (unless inconsistent). The boundary between functional units or processing units in the functional block diagram does not necessarily correspond to the boundary between physical components. Operations of a plurality of functional units may be performed physically by one component, or an operation of one functional unit may be performed physically by a plurality of components. In the sequences and the flowcharts described in the embodiment, the order may be changed as long as there is no inconsistency. For the sake of convenience of description, the DU 1 and the RU 2 have been described using the functional block diagrams, but these devices may be implemented by hardware, software, or a combination thereof. Software executed by the processor included in the DU 1 according to the embodiment of the present invention and software executed by the processor included in the RU 2 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any other appropriate storage medium.

The technique of receiving an uplink reference signal in the RU and receiving measurement information calculated based on the uplink reference signal in the DU in a radio communication network according to the C-RAN has been described above, but the present invention is not limited to the above embodiment, and various modifications or applications can be made within the scope of claims set forth below.

The present international application is based on and claims the benefit of priority of Japanese Patent Application No. 2016-078503 filed on Apr. 8, 2016, the entire contents of which are hereby incorporated by reference.

EXPLANATIONS OF REFERENCE NUMERALS

1 DU
2 RU
UE user equipment
101 RU-associated signal transmission unit
103 RU-associated signal reception unit
105 configuration information management unit
107 UE state management unit
109 measurement information storage unit
201 DU-associated signal transmission unit
203 DU-associated signal reception unit
205 UE-associated signal transmission unit
207 UE-associated signal reception unit
209 configuration information acquisition unit
210 SRS reception determination unit
211 UE state management unit
213 measurement information calculation unit

The invention claimed is:
1. A radio base station, comprising:
an extension station; and
a central aggregate station;
wherein the central aggregate station includes
 a transmitter that transmits resource information of the uplink reference signal to the extension station, and
 a receiver that receives the measurement information from the extension station, and
wherein the extension station includes
 a second receiver that receives the resource information of the uplink reference signal from the central aggregate station,
 a processor that determines whether a resource used when a user equipment transmits an uplink reference signal is allocated based on the resource information of the uplink reference signal received by the second receiver, a first receiver that receives the uplink reference signal from the user equipment based on a determination result of the processor,
wherein the processor calculates measurement information based on the uplink reference signal received by the first receiver, and
a transmitter that transmits the measurement information calculated by the processor to the central aggregate station.

2. The radio base station according to claim 1,
wherein the processor in the central aggregate station manages a state of the user equipment related to transmission of the uplink reference signal,
the transmitter in the central aggregate station transmits a change in the state of the user equipment to the extension station, and
the processor in the extension station determines whether to receive the uplink reference signal from the user equipment based on the change in the state of the user equipment.

3. The radio base station according to claim 2,
wherein carrier aggregation is configured between a plurality of extension stations and the user equipment, and
the transmitter in the central aggregate station transmits the change in the state of the user equipment to the plurality of extension stations.

4. The radio base station according to claim 3,
wherein the transmitter in the extension station transmits the measurement information together with identification information of the user equipment to the central aggregate station, and
the receiver in the central aggregate station receives the measurement information together with the identification information of the user equipment from the extension station.

5. The radio base station according to claim 3,
wherein the transmitter in the extension station multiplexes a plurality of pieces of measurement information into one format and transmits multiplexed measurement information to the central aggregate station.

6. The radio base station according to claim 2,
wherein carrier aggregation is configured between a plurality of extension stations and the user equipment, and
the transmitter in the central aggregate station transmits downlink scheduling information or uplink scheduling information with respect to an extension station to the plurality of extension stations.

7. The radio base station according to claim 6,
wherein the transmitter in the extension station transmits the measurement information together with identification information of the user equipment to the central aggregate station, and
the receiver in the central aggregate station receives the measurement information together with the identification information of the user equipment from the extension station.

8. The radio base station according to claim 6,
wherein the transmitter in the extension station multiplexes a plurality of pieces of measurement information into one format and transmits multiplexed measurement information to the central aggregate station.

9. The radio base station according to claim 2,
wherein the transmitter in the extension station transmits the measurement information together with identification information of the user equipment to the central aggregate station, and
the receiver in the central aggregate station receives the measurement information together with the identification information of the user equipment from the extension station.

10. The radio base station according to claim 2,
wherein the transmitter in the extension station multiplexes a plurality of pieces of measurement information into one format and transmits multiplexed measurement information to the central aggregate station.

11. The radio base station according to claim 1,
wherein the transmitter in the extension station transmits the measurement information together with identification information of the user equipment to the central aggregate station, and
the receiver in the central aggregate station receives the measurement information together with the identification information of the user equipment from the extension station.

12. The radio base station according to claim 11,
wherein the transmitter in the extension station multiplexes a plurality of pieces of measurement information into one format and transmits multiplexed measurement information to the central aggregate station.

13. The radio base station according to claim 1,
wherein the transmitter in the extension station multiplexes a plurality of pieces of measurement information into one format and transmits multiplexed measurement information to the central aggregate station.

14. A measurement information transmission/reception method in a radio base station including an extension station and a central aggregate station, comprising the steps of:
transmitting, by the central aggregate station, resource information of the uplink reference signal to the extension station;
receiving, by the extension station, the resource information of the uplink reference signal from the central aggregate station;
determining, by the extension station, whether a resource used when a user equipment transmits an uplink reference signal is allocated based on the resource information of the uplink reference signal received by the extension station;
receiving, by the extension station, the uplink reference signal from the user equipment based on a result of the determining;
calculating, by the extension station, measurement information based on the received uplink reference signal;
transmitting, by the extension station, the calculated measurement information to the central aggregate station; and
receiving, by the central aggregate station, the measurement information from the extension station.

* * * * *